Aug. 5, 1952 J. HELLER 2,605,928
COOKING UTENSIL WITH COPPER SKIRT
Filed May 27, 1949

INVENTOR.
JACOB HELLER
BY Irving H. Goodfriend
ATTORNEY

Patented Aug. 5, 1952

2,605,928

UNITED STATES PATENT OFFICE 2,605,928

COOKING UTENSIL WITH COPPER SKIRT

Jacob Heller, White Plains, N. Y.

Application May 27, 1949, Serial No. 95,602

1 Claim. (Cl. 220—68)

The present invention relates to a cooking utensil as illustrated by a coffee percolator, and the method of making the same.

The present invention contemplates the provision of a cooking utensil, the body of which is made of one metal and to that portion of the body which is subjected to the application of heat is fitted a skirt of another different metal, preferably such as copper.

The present invention further contemplates the provision of such cooking utensil which is so constructed and arranged that the copper skirt cannot inadvertently or accidentally be removed from the body of the utensil and is so closely fitted thereon that, in essence, it becomes integral therewith.

The present invention still further contemplates the provision of a cooking utensil primarily made from one metal, to the bottom of which, to which heat is applied, is fitted a skirt of a heat retaining metal, such as copper, which thereby provides uniform, even cooking of food by the utensil.

The present invention yet further contemplates the provision of a cooking utensil made from different metals thereby giving a different and beautiful appearance to the cooking utensil.

The present invention also contemplates the provision of a novel method of fitting the copper skirt on the body of the utensil, which is the subject matter hereof, for the purposes above described, the metals from which the body of the utensil and the skirt are formed having the characteristic or property of being able to be drawn into shape.

These, other and further objects and advantages of the present invention will be clear from the description which follows and the drawing appended thereto, in which Fig. 1 is an elevation of a coffee percolator, embodying my invention.

Figure 1:
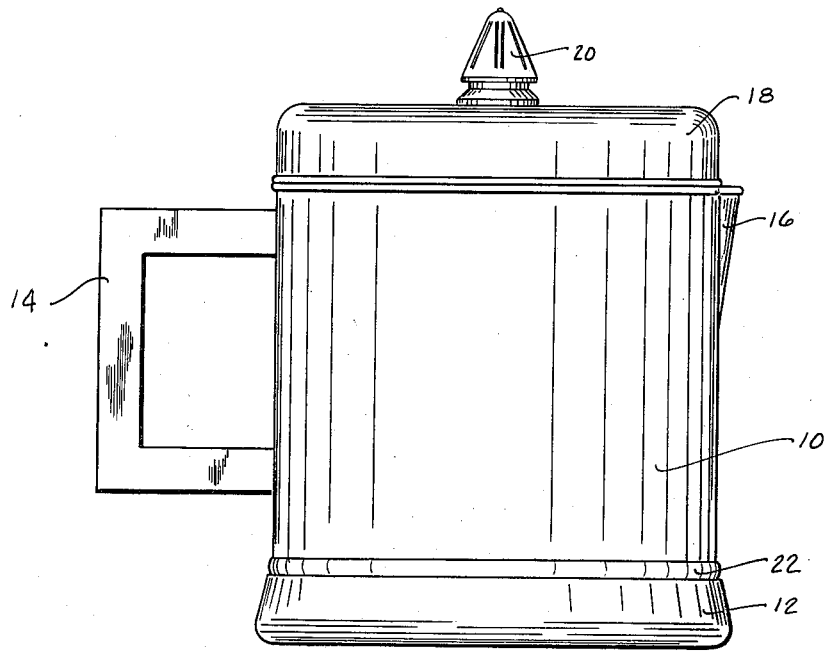

Referring now to the drawing, the percolator 10 is of the conventional type, except for the skirt 12, to which reference will be further made, and is provided with the handle 14, spout 16, the percolator cover 18 and the glass cap 20.

The body of the percolator 10 is preferably made of a somewhat cheaper metal, such as aluminum. While aluminum in the past has been satisfactory, it does not have the heat retaining characteristics of a metal such as copper. The latter metal has been accorded, by the cooking elite, particularly the French, who are known to be the leaders in the art, a demand because of its highly desired cooking characteristics of even, lasting heat which is said to increase the flavor, texture and taste of the food.

I therefore fit a copper skirt 12 onto the percolator at the bottom thereof so that heat is applied to the cooking utensil through copper, which is a relatively expensive metal, whereas the major part of the utensil is made from a cheaper metal such as aluminum, thereby reducing the cost of manufacture and yet providing a utensil which gives the cooking results only associated with more expensive utensils.

The copper skirt 12 flares outwardly and downwardly from the bead 22, on the cylindrical container or body 10 at the bottom thereof.

The copper skirt thus fits on the body 10 so that it will be located completely over the flame of the stove on which the utensil is placed and extends upward on the body a sufficient distance to provide the desired heating characteristics so that the cooking heat is concentrated where it will be economically used and not wasted in rising upward around the utensil.

Further, since the skirt is made of copper, it is easily and readily kept clean.

It will of course be understood that a coffee percolator is used for purposes of illustration only as my invention may be applied to any other type of cooking utensil.

Figure 2:
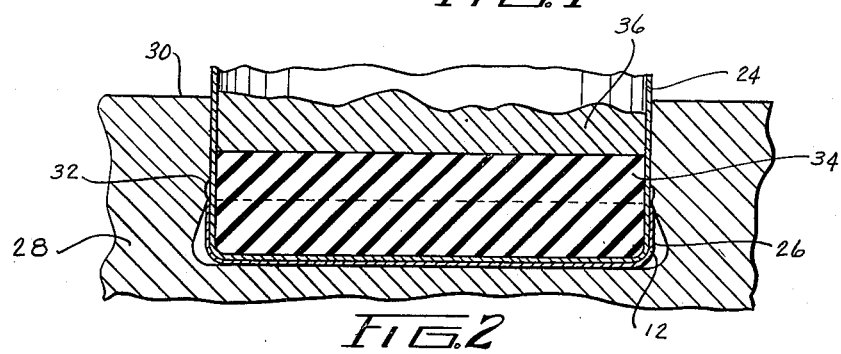
Fig. 2 is a partial section of the bottom thereof before the skirt is formed thereon.

In order to mount the skirt 12 on the body 10 of the coffee percolator, referring now to Fig. 2, I seat the cylindrical blank 24 and the cup-like copper element 26 in the die 28. It should be noted that the upper part 30 of the die 28 fits against the blank 24 and is recessed therebelow at 32 to form the bead 22 and flares outwardly away from the blank 24 and element 26 to form the flared lower part of the utensil, all as will be explained hereinbelow.

The rubber expanding shaping member 34 is then positioned in the cylinder blank 24 with the ram or mandril 36 held against the rubber expanding member 34, which latter has a diameter of approximately three thousandths of an inch less than the internal diameter of the cylindrical blank 24.

Figure 3:
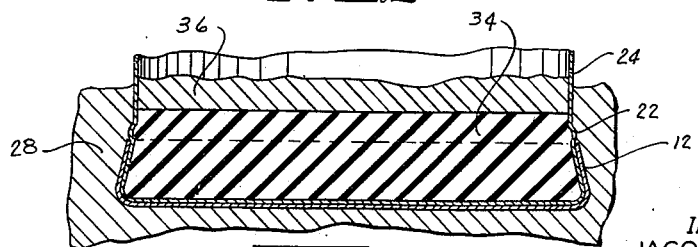
Fig. 3 is a similar view showing the body of the percolator forced into final shape.

Referring now to Fig. 3, the ram or mandril 36 is forced down against the rubber member 34 by any conventional means, which since it forms no part of my invention need not be described, with a pressure of approximately eighty tons. The rubber member 34 is made of material which will withstand such pressure.

This operation forces the rubber material against the adjacent parts of the cylindrical blank 24 and the copper element 26 bending or drawing them into shape into the die 28 cavity and forming the outward flaring portion. The thus shaped bottom of the cylindrical blank is bulged and fitted into tightly against the copper skirt 12 leaving no air space in between and making a substantially perfect contact between them.

The bead 22 assists in this forming operation and the outward flare prevents the skirt from being inadvertently separated from the body of the percolator.

The aluminum or silver colored body having a copper colored skirt gives a beautiful and pleasing appearance to the thus formed cooking utensil.

After the utensil has been formed in the manner that I have described, the ram or mandril 36 is raised from the interior of the formed cooking utensil and the rubber member 34, which has returned to normal shape, removed therefrom.

While I have illustrated a specific embodiment of my invention and one means of producing it, I do not intend to be limited to the details shown but desire to claim the invention as broadly as the appended claim and the state of the art permit.

I claim:

A coffee percolator having a cylindrical body made from sheet aluminum and with a bottom wall and outwardly extending bead around its lower circumference above the bottom wall, the body flaring outwardly and downwardly from the bead to the bottom wall of the percolator, and a skirt of sheet copper having a similar flare and fitted tightly against the outwardly flaring portion of the body in contact therewith throughout the adjacent portions of the skirt and the bottom wall of the body, said skirt positioned below the bead with the upper edge of the skirt contacting the bead, said body and skirt being substantially of similar thickness.

JACOB HELLER.

REFERENCES CITED

The following references are of record in the file of this patent:

UNITED STATES PATENTS

| Number | Name | Date |
|---|---|---|
| 547,224 | McLaughlin | Oct. 1, 1895 |
| 733,979 | Lisk | July 21, 1903 |
| 1,305,702 | Ehlert | June 3, 1919 |
| 1,447,180 | Player | Mar. 6, 1923 |
| 2,151,535 | Scurlock | Mar. 21, 1939 |
| 2,217,555 | Klusmeyer | Oct. 8, 1940 |
| 2,292,669 | Sinclair et al. | Aug. 11, 1942 |
| 2,517,584 | Mapes et al. | Aug. 8, 1950 |

FOREIGN PATENTS

| Number | Country | Date |
|---|---|---|
| 166,076 | Great Britain | July 14, 1921 |
| 583,707 | Great Britain | Dec. 24, 1946 |